US008116833B2

(12) United States Patent
Tsai et al.

(10) Patent No.: US 8,116,833 B2
(45) **Date of Patent: *Feb. 14, 2012**

(54) GROUNDING APPARATUS OF PORTABLE ELECTRONIC DEVICES

(75) Inventors: Ching-Sen Tsai, Tu-Cheng (TW); Cheng-Lung Chang, Tu-Cheng (TW); Mei-Tsu Tsao, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 1006 days.

This patent is subject to a terminal disclaimer.

(21) Appl. No.: 11/964,574

(22) Filed: Dec. 26, 2007

(65) Prior Publication Data

US 2009/0034175 A1 Feb. 5, 2009

(30) Foreign Application Priority Data

Aug. 3, 2007 (CN) .......................... 2007 1 0075543

(51) Int. Cl.
*H04M 1/00* (2006.01)

(52) U.S. Cl. ................... 455/575.3; 455/347; 455/550.1

(58) Field of Classification Search ................ 455/575.3
See application file for complete search history.

(56) References Cited

U.S. PATENT DOCUMENTS 7,515,930 B2 * 4/2009 Eromaki .................... 455/550.1
2008/0024893 A1 * 1/2008 Vanjani et al. .................... 360/1
2009/0005134 A1 * 1/2009 Abdul-Gaffoor et al. . 455/575.4

FOREIGN PATENT DOCUMENTS

TW 308540 Y 3/2007
WO WO 2006031078 A1 * 3/2006

* cited by examiner

*Primary Examiner* — Duc Nguyen
*Assistant Examiner* — Ajibola Akinyemi
(74) *Attorney, Agent, or Firm* — Altis Law Group, Inc.

(57) ABSTRACT

A grounding apparatus (200) for a portable electronic device (100) includes a conductive member (20), at least one connecting member (30) and a grounded sliding mechanism (40). The connecting member is electronically connected to the conductive member. The sliding mechanism is electrically connected to the conductive member via the connecting member.

20 Claims, 12 Drawing Sheets

GROUNDING APPARATUS OF PORTABLE ELECTRONIC DEVICES

BACKGROUND OF THE INVENTION

1. Field of the Invention

The present invention relates to grounding apparatuses, particularly to a grounding apparatus of a portable electronic device with a sliding mechanism.

2. Description of Related Art

Sliding cover mechanisms are widely used in portable electronic devices such as mobile phones, laptops and personal digital assistants (PDAs). Generally, such portable electronic device includes a base, a cover and a sliding apparatus, and the cover is slidingly mounted on the base via the sliding apparatus. The cover includes a liquid crystal module (LCM), and the base includes a circuit board. The liquid crystal module is electrically connected to the circuit board via a flexible printed circuit (FPC).

When the aforementioned portable electronic device is used, a high electrostatic discharge (ESD) may be generated in the LCM and the damage portable electronic device. For example, when walking on a carpet floor, a person can easily acquires static charge with high electrostatic. The static charge is likely to cause an instantaneous discharging between the body of the person and the portable electronic device. Thus, the discharging could possibly create an electrical current significantly enough to cause damages to the circuits of the portable electronic device. Therefore, it is necessary to prevent the circuits of the portable electronic device to from being damaged by electrostatic discharge.

In use of the aforementioned portable electronic device with a sliding cover mechanism, a typical method to prevent the circuit from being damaged by electrostatic discharge is directly connecting the flexible printed circuit to a grounding plane for conducting the electrostatic charges. However, the flexible printed circuit usually does not have an enough conductivity to conduct an electrostatic discharge having a potential higher than a thousand volts.

Therefore, a new grounding apparatus is desired in order to overcome the above-described shortcomings.

SUMMARY

A grounding apparatus for a portable electronic device includes a conductive member, at least one connecting member and a grounded sliding mechanism. The connecting member is electronically connected to the conductive member. The sliding mechanism is electrically connected to the conductive member via the connecting member.

Other advantages and novel features will become more apparent from the following detailed description when taken in conjunction with the accompanying drawings.

BRIEF DESCRIPTION OF THE DRAWINGS

Many aspects of the present grounding apparatus can be better understood with reference to the following drawings. The components in the various drawings are not necessarily drawn to scale, the emphasis instead being placed upon clearly illustrating the principles of the present grounding apparatus. Moreover, in the drawings, like reference numerals designate corresponding parts throughout the figures.

DETAILED DESCRIPTION OF THE EMBODIMENT

Figure 1:
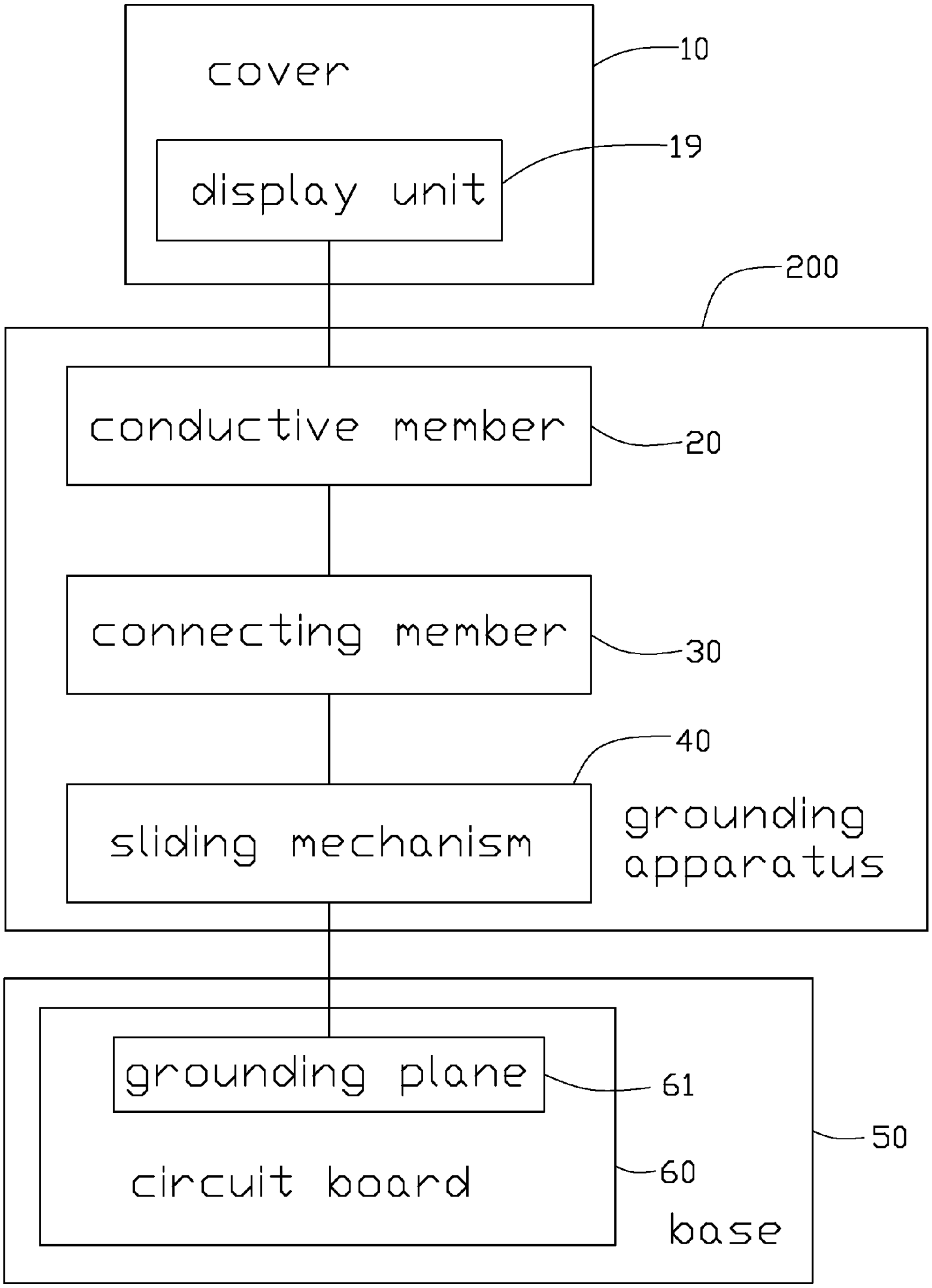
FIG. 1 is a diagram of electronic connection of the portable electronic device in accordance with a present embodiment.
Figure 2:
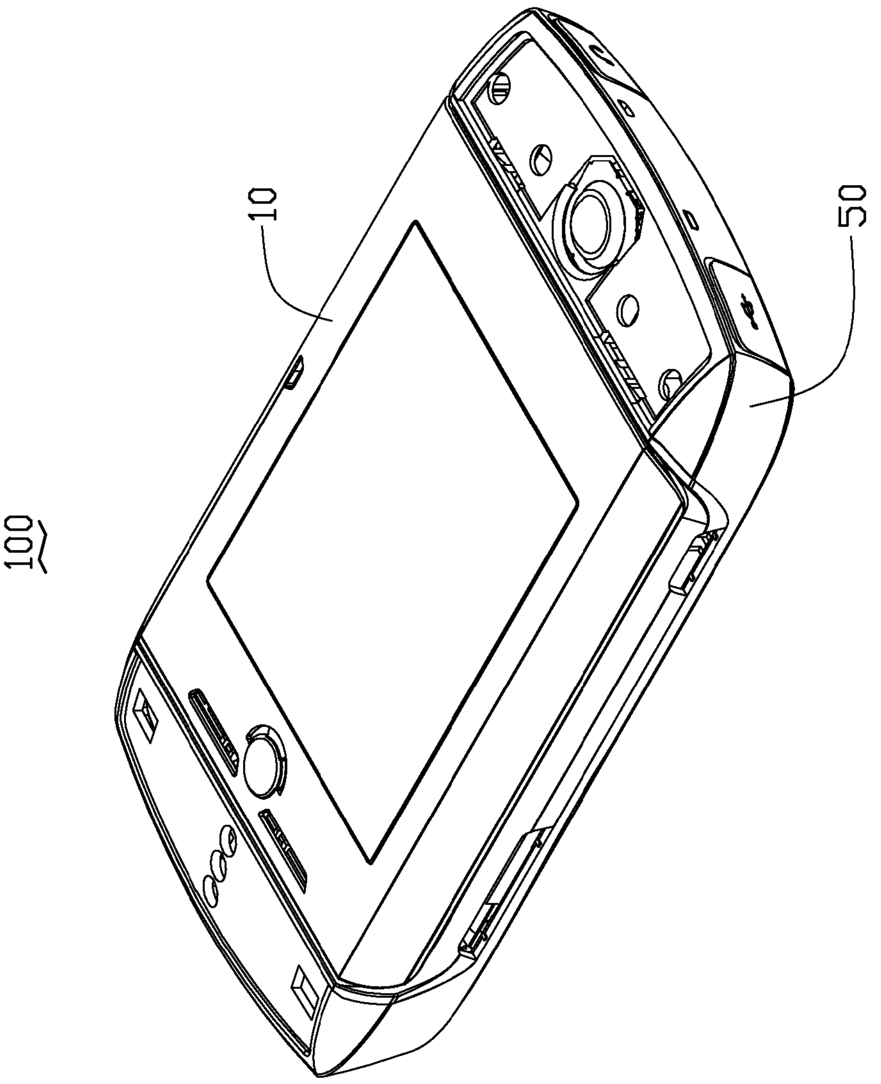
FIG. 2 is a closed, schematic view of a portable electronic device with the grounding apparatus shown in FIG. 1.

Referring to FIGS. 1 and 2, a grounding apparatus 200 in accordance with a present embodiment is provided. The grounding apparatus 200 is mounted in a portable electronic device 100 and includes a conductive member 20, at least one connecting member 30 and a sliding mechanism 40.

Figure 3:
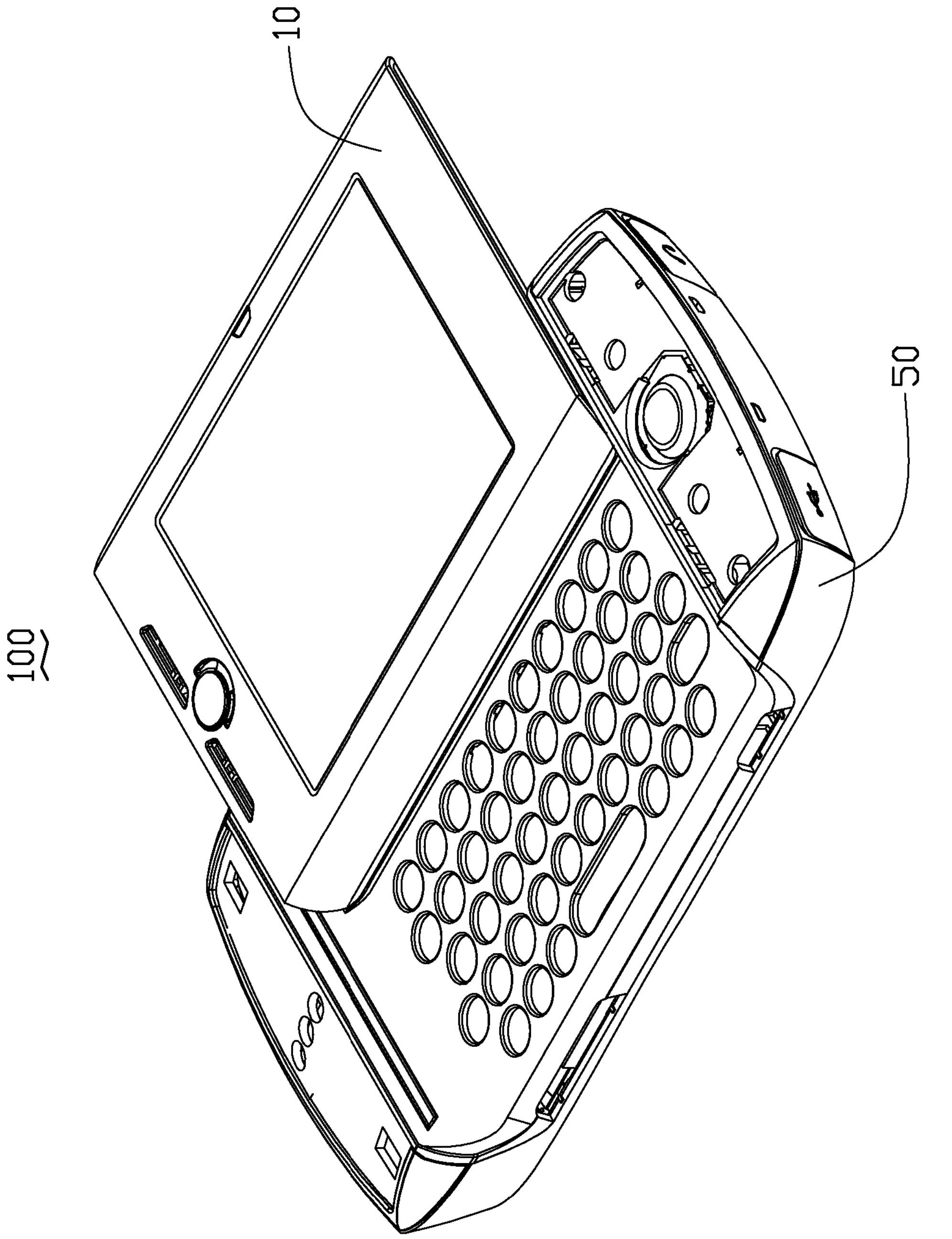
FIG. 3 is an opened, schematic view of the portable electronic device shown in FIG. 2.

Also referring to FIG. 3, the portable electronic device 100 can be a mobile phone, a laptop, a personal digital assistant (PDA), etc. The portable electronic device 100 includes a cover 10, a base 50 and a circuit board 60. The cover 1 0 is movably mounted on the base 50 via the sliding member 40.

Figure 4:
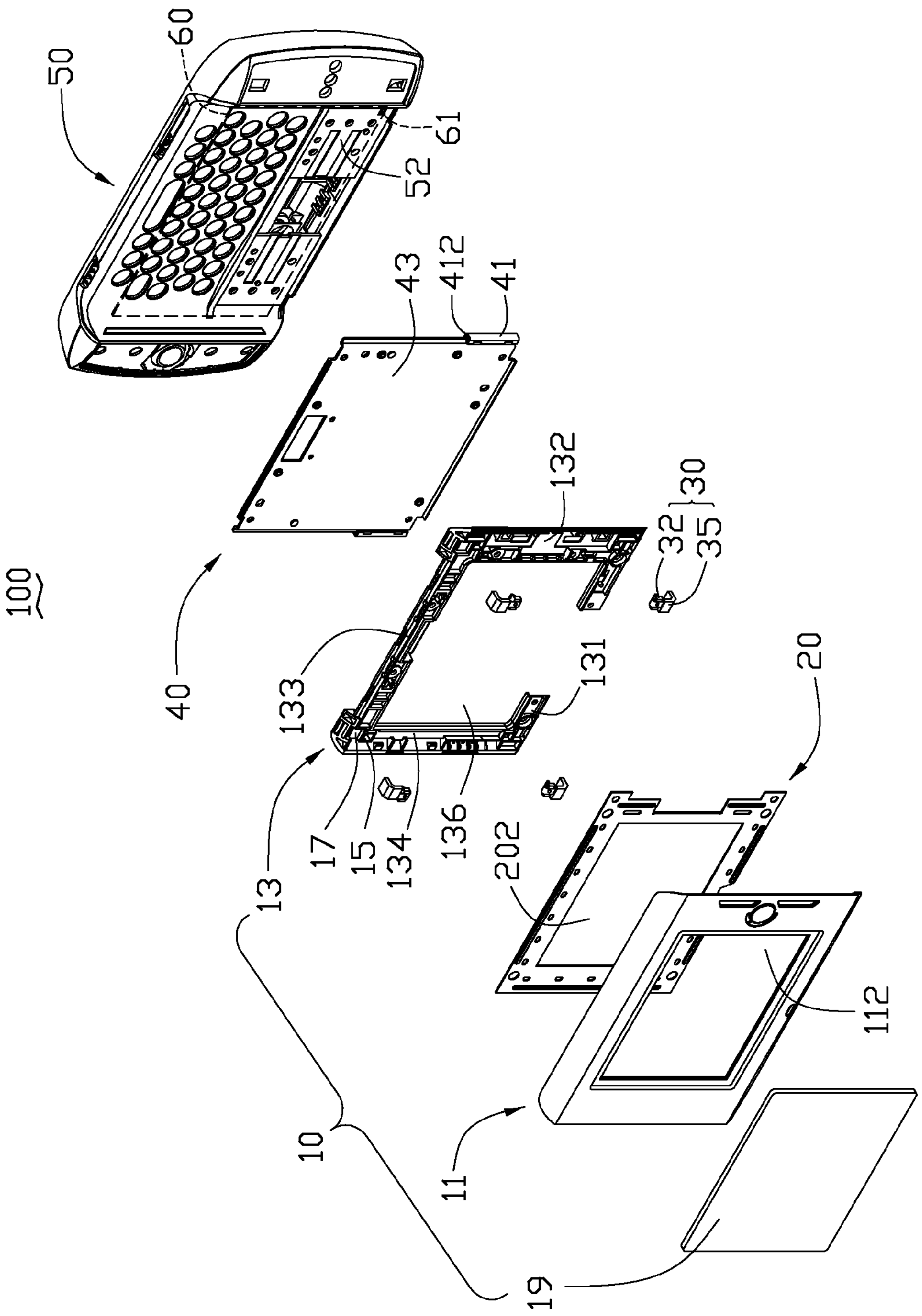
FIG. 4 is a partly disassembled view of the portable electronic device shown in FIG. 2.

Also referring to FIG. 4, the cover 10 includes an approximately rectangular housing 11, an approximately rectangular frame 13 and a display unit 19. The housing 11 is mounted on the frame 13 and defines a rectangular first opening 112 corresponding to an outer shape of the display unit 19 in its middle portion. The frame 13 includes four sides 131, 132, 133 and 134, and defines a rectangular second opening 136 corresponding to the first opening 112 in its middle portion. The frame 13 also defines a first container 15 and a second container 17 in each corner thereof.

Figure 5:
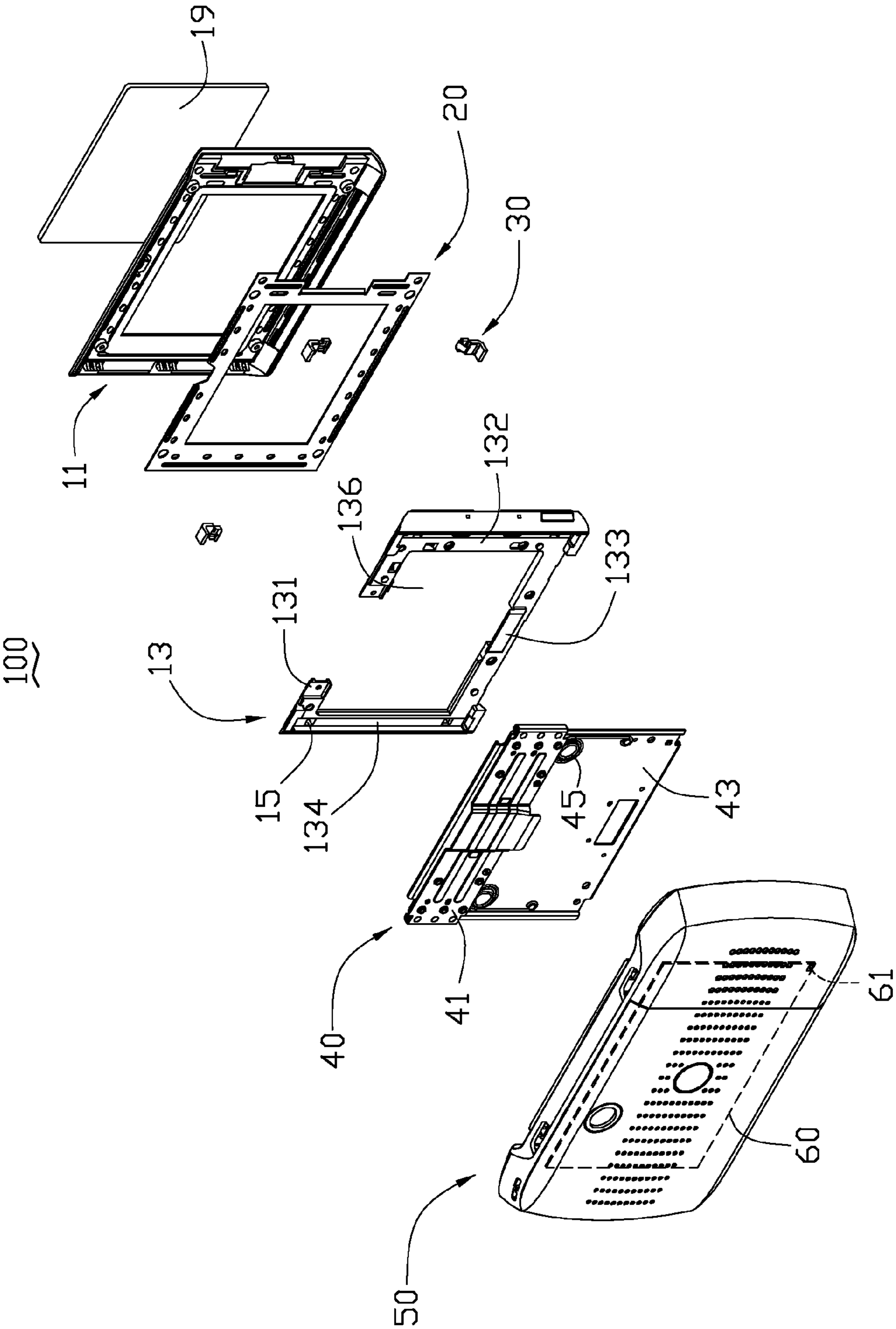
FIG. 5 is similar to FIG. 4, but shown in another visual angle.
Figure 6:
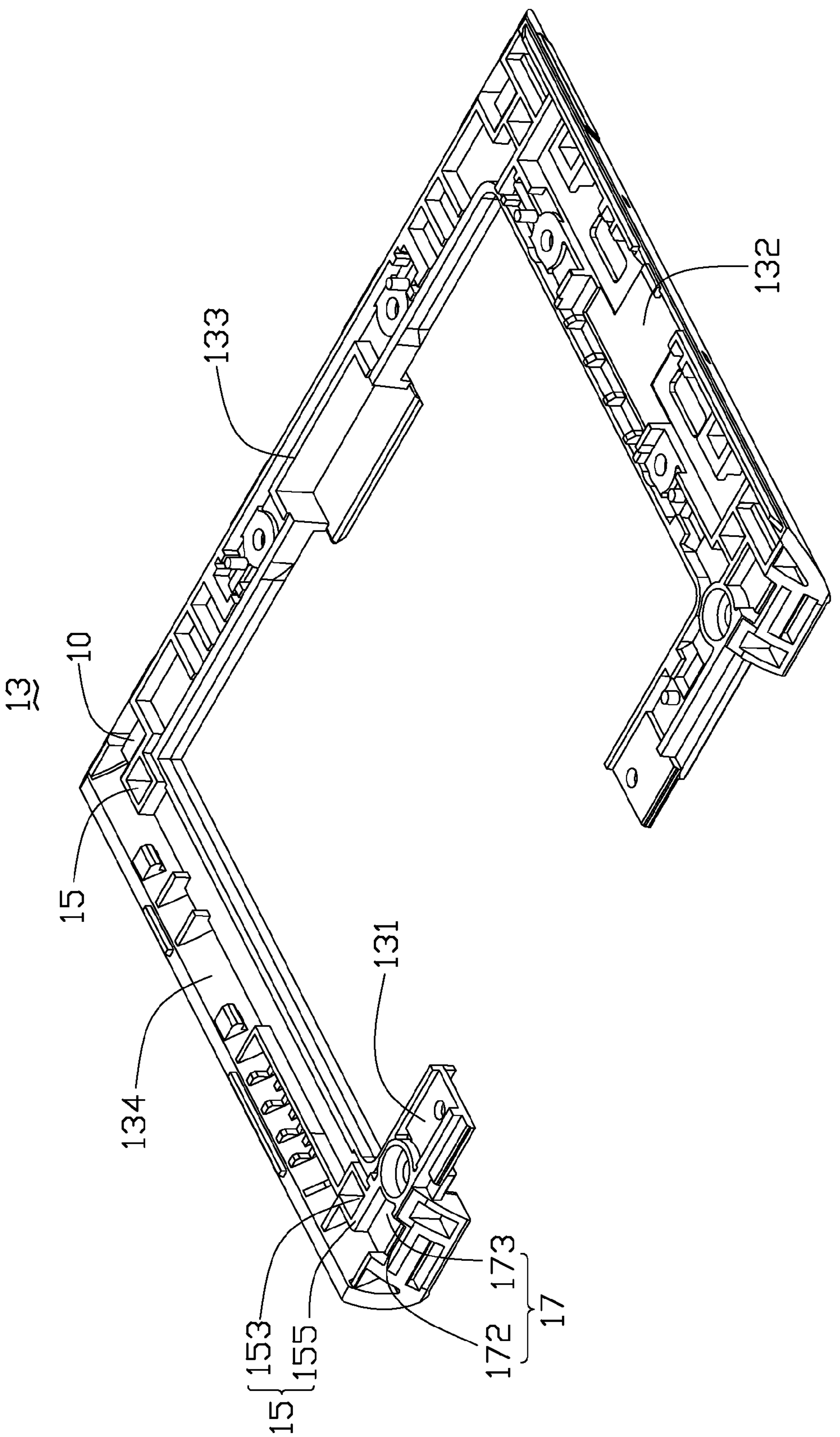
FIG. 6 is an enlarged, schematic view of a frame of the portable electronic device shown in FIG. 2.

Also referring to FIG. 5 and FIG. 6, the first container 15 is a hollow protrusion formed on a surface at each corner of the frame 13. Each first container 15 includes a rectangular installing hole 153 and a containing wall 155. The frame 13 defines the installing hole 153 in a middle portion of the first container 15, and thus forms the containing wall 155 corresponding to the installing hole 153. The installing hole 153 runs through both sides of the frame 13. Each second container 17 is formed between each first container 15 and the verge of the frame 13. Each second container 17 includes a installing aperture 172 and a block wall 173. The installing aperture 172 runs through both sides of the frame 13. The block wall 173 is formed between the first container 15 and the installing aperture 172, and approximately perpendicular to the containing wall 155.

The conductive member 20 is an approximately rectangular board made of conductive materials such as metal. The conductive member 20 is mounted between the housing 11 and the frame 13. The conductive member 20 defines an approximately rectangular third opening 202 corresponding to the first opening 112 of the housing 11 and the second opening 136 of the frame 13. In this way, when the housing 11, the frame 13 and the conductive member 20 are assembled together, the first opening 112, the second opening 136 and the third opening 202 can contain the display unit 19 of the portable electronic device 100.

Figure 7:
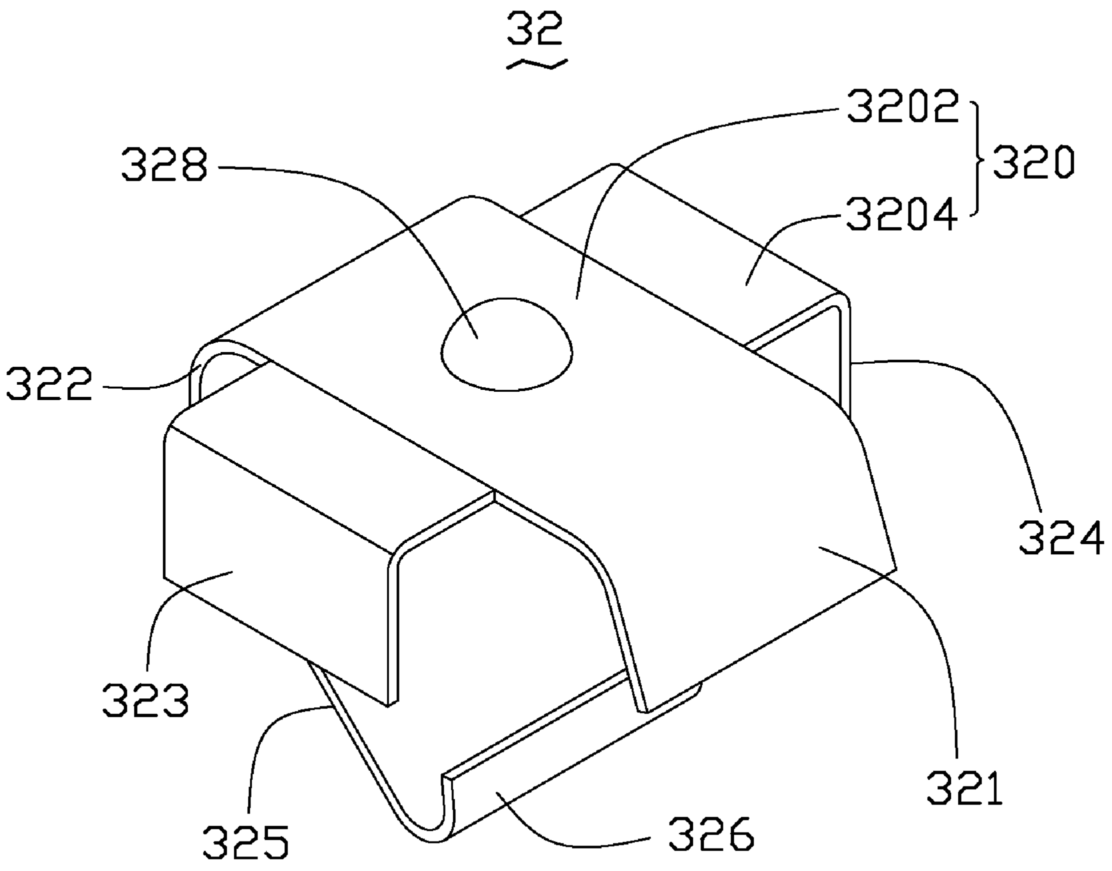
FIG. 7 is an enlarged, schematic view of a connecting member of the portable electronic device shown in FIG. 2.
Figure 8:
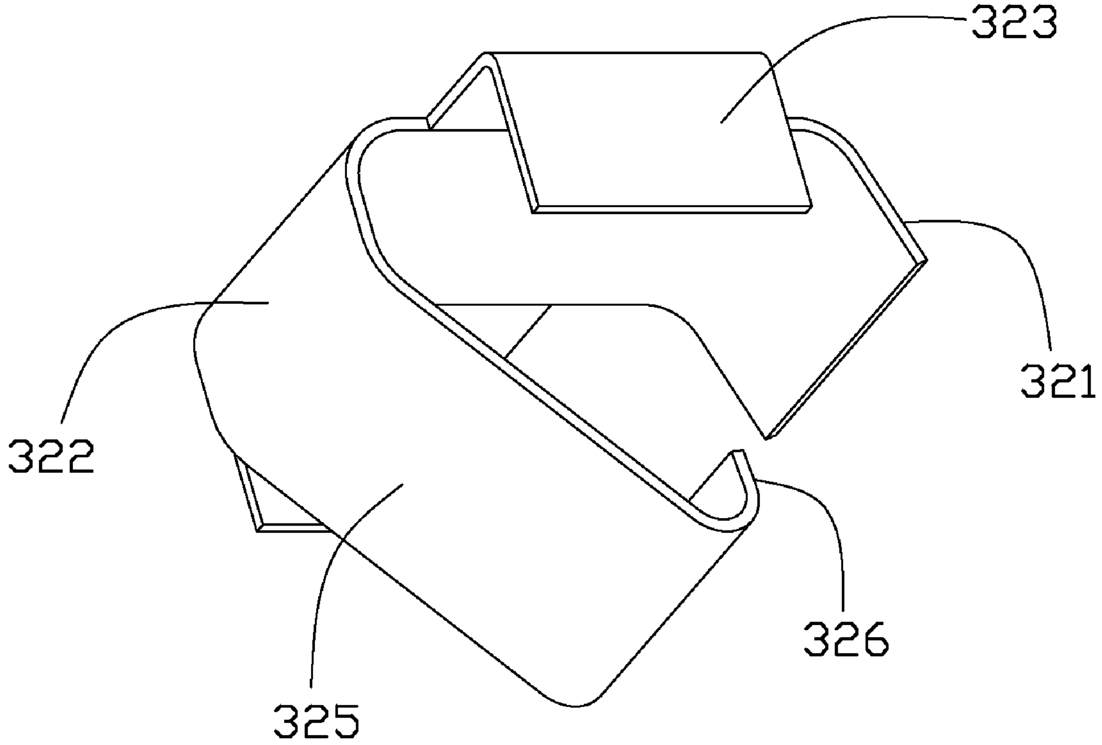
FIG. 8 is similar to FIG. 7, but shown in a second visual angle.
Figure 9:
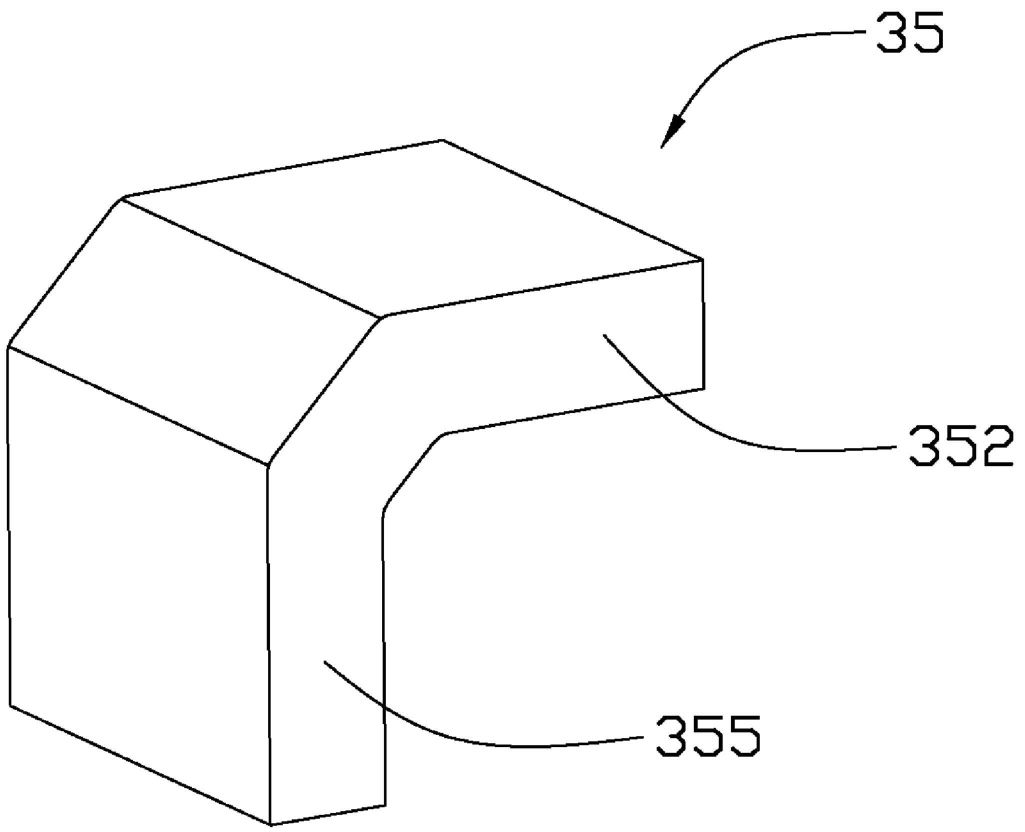
FIG. 9 is an enlarged, schematic view of a block member of the portable electronic device shown in FIG. 2.

Also referring to FIGS. 7-9, the connecting member 30 includes a resilient component 32 and a block component 35. The resilient member 32 is made of conductive materials such as metal and includes a main portion 320, a first bent portion 321, a second bent portion 322, a third bent portion 323, a fourth bent portion 324, a resilient portion 325 and a connecting portion 326. The main portion 320 is approximately cross-shaped, and includes a central portion 3202 and four extending portions 3204 extending from the central portion 3202. An approximately hemispherical protrusion 328 is formed on the central portion 3202. The end of each extending portion 3204 bends towards a same direction approximately perpendicular to the central portion 3202 to form the first bent portion 321, the second bent portion 322, the third bent portion 323 and the fourth bent portion 324. The first bent portion 321 and the second bent portion 322 are perpendicular to the third bent portion 323 and the fourth bent portion 324. An end of the second bent portion 322 bends towards the first bent portion 321 to form the resilient portion 325. An end of the resilient portion 325 bends towards the main portion 320 to form the connecting portion 326.

Referring particularly to FIG. 9, the block component 35 is an approximately rectangular board bent to L-shaped and made of conductive materials such as metal. The block component 35 includes a mounting portion 352 and an inserting portion 355. The mounting portion 352 and the inserting portion 355 are both approximately rectangular board, and the inserting portion 355 is configured to be approximately perpendicular to the mounting portion 352.

Referring to FIG. 4 and FIG. 5, the sliding mechanism 40 includes a static member 41, a sliding member 43 and two resilient members 45. The static member 41 is an approximately rectangular board and made of conductive materials defining two sliding grooves 412 in its two opposite sides. The sliding member 43 is also an approximately rectangular board and made of conductive materials. Two opposite sides of the sliding member 43 respectively engage in the sliding grooves 412, thus the sliding member 43 is mounted on the static member 41 and can slide along the sliding grooves 412. The resilient members 45 are two coiled springs, one end of each resilient member 45 is mounted on the static member 41, and another end of each resilient member 45 is mounted on the sliding member 43. In this way, the resilient members 45 can resile to move the slid sliding member 43 to its initial position.

The base 50 is an approximately rectangular board and defines a installing recess 52 corresponding to an outer shape of the static member 41. The circuit board 60 of the portable electronic device 100 is mounted in the base 50. Also referring to FIG. 1, the circuit board 60 has a grounding plane 61.

Figure 10:
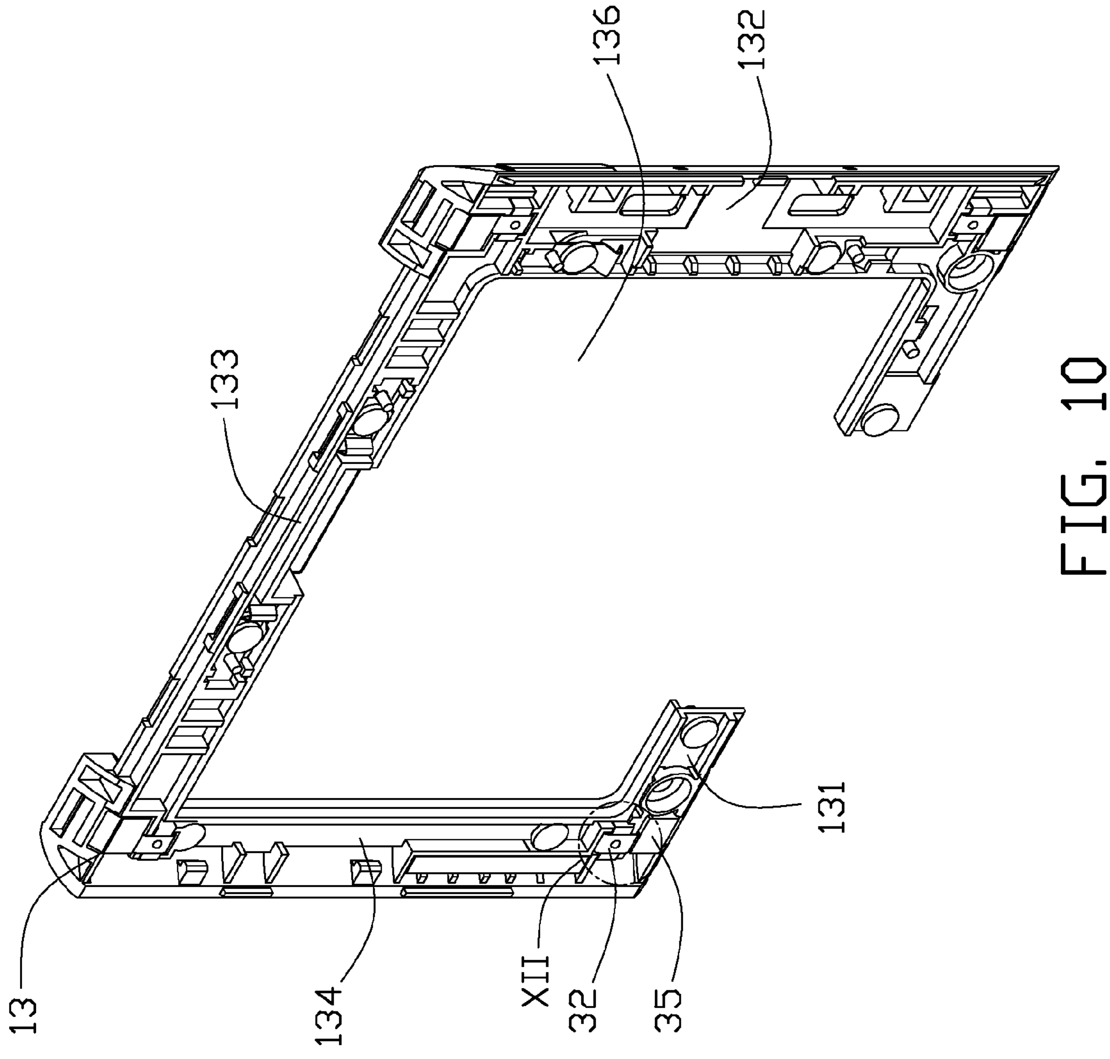
FIG. 10 is an assembled view of the frame shown in FIG. 6, the connecting member shown in FIG. 7 and the block member shown in FIG. 9.
Figure 11:
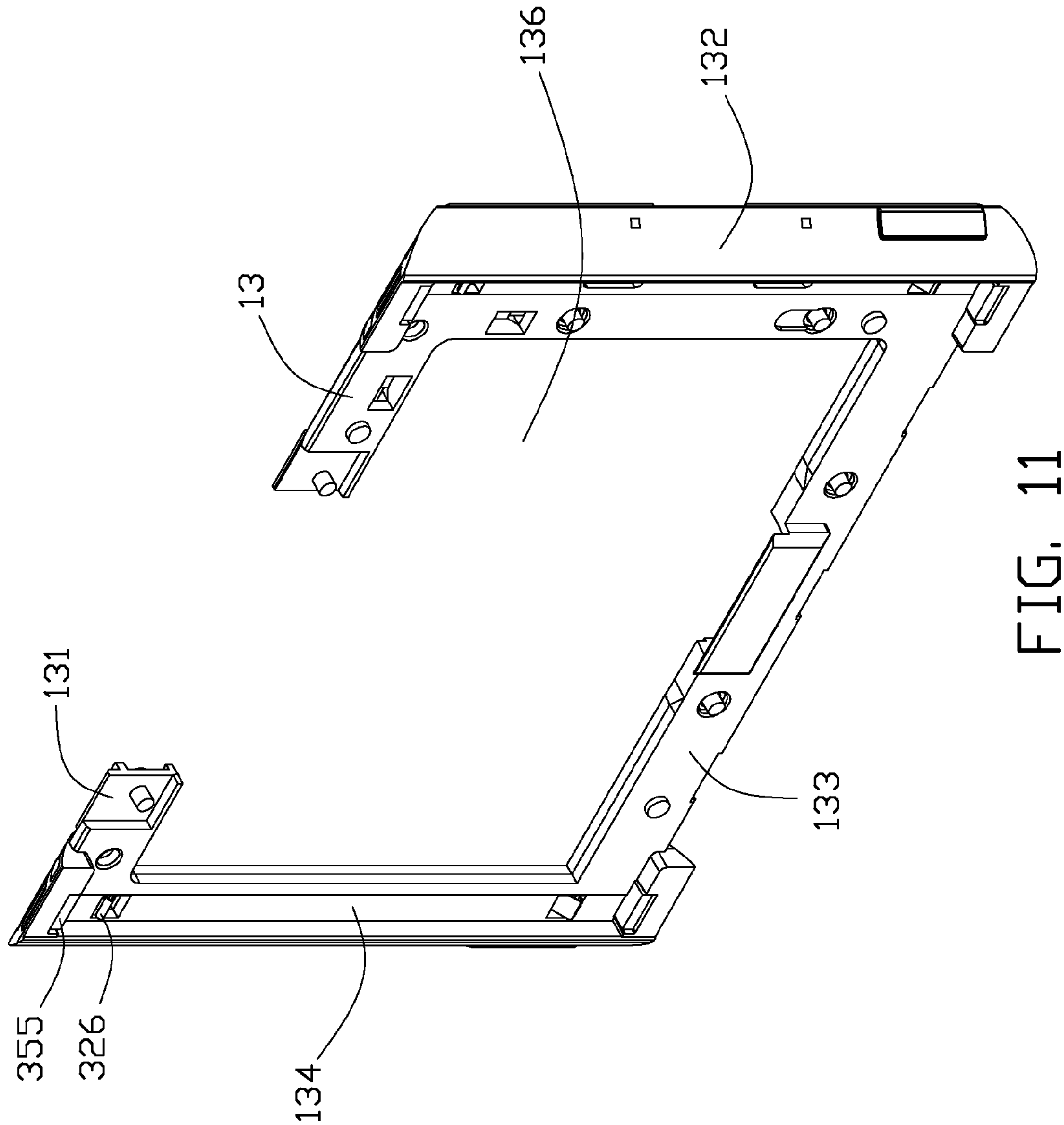
FIG. 11 is similar to FIG. 10, but shown in another visual angle.
Figure 12:
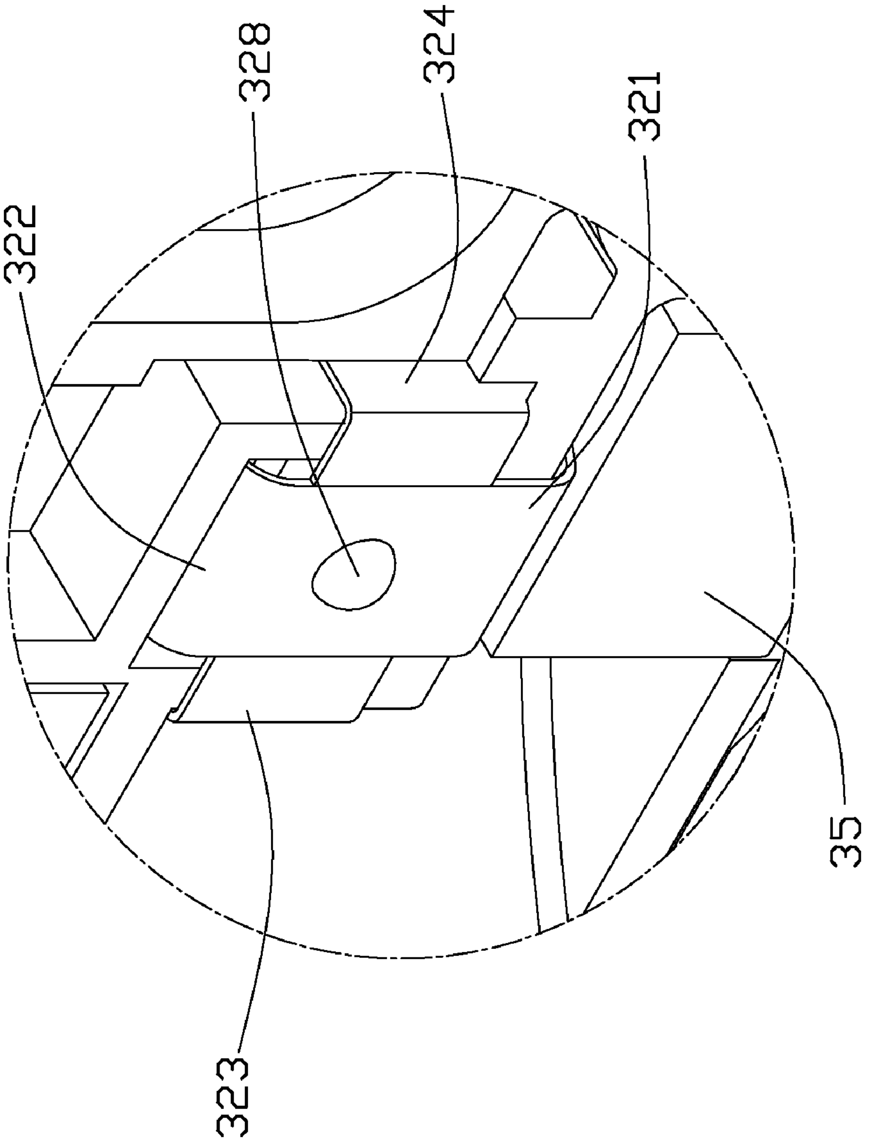
FIG. 12 is an enlarged view of the area XII shown in FIG. 10.

In assembly, four connecting members 30 are mounted to the frame 13 of the cover 10. Referring to FIG. 10 to FIG. 12, the connecting portion 326 and the resilient portion 325 of each connecting member 30 are respectively inserted into an installing hole 153. The second bent portion 322 is sustained by an inner surface of the containing wall 155, and the connecting portion 326 exposes out of the installing hole 153. The main portion 320 covers the installing hole 153 and the containing wall 155. The first bent portion 321, the third bent portion 323 and the fourth bent portion 324 together envelop the first container 15 and keep in tight contact with an outer surfaces of the containing wall 155. The block component 35 is then mounted in the second container 17. The mounting portion 352 of the block component 35 is sustained by the block wall 173, and an end of the mounting portion 352 keeps in tight contact with the first bent portion 321 enveloping the first container 15. The inserting portion 355 is inserted into the installing aperture 172, and an end of the inserting portion 355 extends out of the installing aperture 172. In this way, the connecting member 32 and the block member 35 are held on the frame 13.

Also referring to FIG. 3 and FIG. 4, the frame 13 with the connecting members 30 are assembled with the housing 11 and the conductive member 20 via bolting, soldering or gluing. The conductive member 20 is mounted between the frame 13 and the housing 11. The protrusion 328 is in contact with the conductive member 20 for conducting electricity. The display unit 19 is contained within the first opening 112, the second opening 136 and the third opening 202, and the display unit 19 is electronically connected to the conductive member 20. In this way, the cover 10 is completely assembled.

The sliding member 40 is then assembled with the cover 10. The sliding member 43 is assembled with the frame 13 and electronically connected to the frame 13 via bolting, soldering or gluing. The exposing connecting portion 326 of each connecting member 32 is in contact with the static member 41 for conducting electricity. The sliding member 43 mounted on the static member 41 is moved to a predetermined initial position corresponding to a closed state of the portable electronic device 100. The inserting portion 355 of each block member 35 is in contact with the sliding member 43 for conducting electricity. Finally, the static member 41 is contained in the installing recess 52 of the base 50, and is electronically connected to the grounding plane 61 of the circuit board 60 via wires, bolting, soldering or gluing, etc. In this way, the portable electronic device 100 is completed, the cover 10 is movably mounted to the base 50 via the sliding mechanism 40, and the display 19 is electronically connected to the grounding plane 61 via the grounding apparatus 200.

In use, a high electrostatic charge may be generated and collected on the display unit 19 of the portable electronic device 100 and it is inclined to occur discharging. However, when an instantaneous discharging occurs, the collected electrostatic charge passes through the conductive member 20, the connecting members 32, the block member 35, the sliding member 43 and the static member 41 to the grounding plane 61 in the order written, and finally is conducted to the grounding plane 61. In this way, the grounding apparatus 200 prevents the electrostatic charges from damaging the potable electronic device 100. Understandably, the electrostatic charge can also be transferred from the connecting member 32 directly via the connecting portion 326 of the static member 41 to the grounding plane 61, and thus is conducted to the grounding plane 61. Compared with the typical protecting method of directly connecting a flexible printed circuit of a portable electronic device to a grounding plane to conduct the electrostatic charges, the present embodiment contains more channels to conduct electrostatic charges, thus protects the portable electronic device more effectively.

Understandably, the number of the connecting member 30 can be changed according to the size and shape of the portable electronic device 100.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A grounding apparatus for a portable electronic device that includes a base and a cover, comprising:

a conductive member electrically connected to a display unit of the portable electronic device;

at least one connecting member electronically connected to the conductive member, the connecting member including a resilient component, and the resilient component including a main portion and a plurality of bent portions formed on the main portion; the main portion being in contact with the conductive member to be electrically connected to the conductive member, and the bent portions enveloping a part of the cover to assemble the resilient member on the cover; and a grounded sliding mechanism slidably connecting the cover to the base and electrically connected to the conductive member via the connecting member, such that electrostatic charges generated on the display unit are transmitted to a ground through the conductive member, the connecting member, and the sliding mechanism.

2. The grounding apparatus as claimed in claim 1, wherein one of the bent portions has an end bent to form a resilient portion, and an end of the resilient portion bent to form a connecting portion.

3. The grounding apparatus as claimed in claim 2, wherein a protrusion is formed on the main portion of the resilient member, and the protrusion is in contact with the conductive member.

4. The grounding apparatus as claimed in claim 3, wherein the main portion is substantially cross-shaped and includes a central portion and four extending portions extending from the central portion; the protrusion formed on the central portion; distal ends of the four extending portions substantially bent towards the same direction to form the bent portions, and two of the bent portions being substantially perpendicular to the other two of the bent portions.

5. The grounding apparatus as claimed in claim 2, wherein the sliding mechanism includes a static member being in contact with the connecting portion.

6. The grounding apparatus as claimed in claim 5, wherein the connecting member further includes a block component being in contact with the resilient component and the sliding mechanism.

7. The grounding apparatus as claimed in claim 6, wherein the block component includes a mounting portion and an inserting portion, the mounting portion being in contact with the resilient component; and the sliding mechanism further includes a sliding member slidably assembled on the static member, the inserting portion being in contact with the sliding member.

8. A portable electronic device, comprising:

a cover including a frame and a display unit mounted in the frame;

a base including a grounding plane; and a grounding apparatus, the grounding apparatus including a conductive member, at least one connecting member and a sliding mechanism; the conductive member being mounted to the frame and electronically connected to the display unit; the connecting member electronically connecting the conductive member with the sliding mechanism; the connecting member including a resilient component, and the resilient component including a main portion and a plurality of bent portions formed on the main portion; the main portion being in contact with the conductive member to be electrically connected to the conductive member, and the bent portions enveloping a part of the frame to assemble the resilient member on the frame; the cover being movably mounted to the base via the sliding mechanism, and the sliding mechanism being electronically connected to the grounding plane; wherein electrostatic charges generated on the display unit are transmitted to the ground plane through the conductive member, the connecting member, and the sliding mechanism.

9. The portable electronic device as claimed in claim 8, wherein the cover includes a housing defining a first opening corresponding to an outer shape of the display unit therein, and the frame defines a second opening corresponding to the first opening therein; the conductive member being mounted between the housing and the frame and defines a third opening corresponding to the first opening and the second opening therein, the display unit being contained in the first opening, the second opening and the third opening.

10. The portable electronic device as claimed in claim 8, wherein the frame includes at least one first container, the bent portions envelop the first container to assemble the resilient member on the frame.

11. The portable electronic device as claimed in claim 10, wherein the first container is a hollow protrusion formed on the frame and includes a installing hole and a containing wall, the frame defining the installing hole in a middle portion of the first container, and thus forming the containing wall corresponding to the installing hole; the installing hole running through both sides of the frame.

12. The portable electronic device as claimed in claim 11, wherein one of the bent portions has an end bending to form a resilient portion, and an end of the resilient portion bent to form a connecting portion; the bent portion that forms the resilient portion and the connecting portion being sustained by an inner surface of the containing wall, and other bent portions enveloping the first container and keeping in tight contact with the containing wall.

13. The portable electronic device as claimed in claim 12, wherein a protrusion being in contact with the conductive member is formed on the main portion of the resilient member.

14. The portable electronic device as claimed in claim 13, wherein the sliding mechanism includes a static member mounted on the base and being in contact with the connecting portion.

15. The portable electronic device as claimed in claim 13, wherein the main portion is substantially cross-shaped and includes a central portion and four extending portions extending from the central portion; the protrusion formed on the central portion; distal ends of the four extending portions substantially bent towards the same direction to form the bent portions, and two of the bent portions being substantially perpendicular to the other two of the bent portions.

16. The portable electronic device as claimed in claim 11, wherein the connecting member further includes a block component and the frame further includes at least one second container, the block component being mounted in the second container and in contact with the resilient component and the sliding mechanism.

17. The portable electronic device as claimed in claim 16, wherein the second container is formed between each first container and the verge of the frame, the second container including a installing aperture and a block wall; the installing aperture running through both side of the frame, the block wall being formed between the first container and the installing aperture, and configured to be perpendicular to the containing wall.

18. The portable electronic device as claimed in claim 17, wherein the block component includes a mounting portion and an inserting portion configured to be perpendicular to the mounting portion.

19. The portable electronic device as claimed in claim 18, wherein the mounting portion is sustained by the block wall and in contact with the resilient member, and the inserting portion is inserted into the installing aperture and in contact with the sliding mechanism.

20. The portable electronic device as claimed in claim 19, wherein the sliding mechanism further includes a sliding member mounted on the cover and slidably assembled on the static member, an end of the inserting portion extending out of the installing aperture and being in contact with the sliding member.

* * * * *